United States Patent
Barham et al.

(10) Patent No.: US 9,268,613 B2
(45) Date of Patent: Feb. 23, 2016

(54) SCHEDULING AND MANAGEMENT IN A PERSONAL DATACENTER

(75) Inventors: Paul Barham, San Francisco, CA (US); Joseph N. Figueroa, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 315 days.

(21) Appl. No.: 12/972,563

(22) Filed: Dec. 20, 2010

(65) Prior Publication Data

US 2012/0159506 A1    Jun. 21, 2012

(51) Int. Cl.
*G06F 9/46* (2006.01)
*G06F 9/50* (2006.01)

(52) U.S. Cl.
CPC ............ *G06F 9/5044* (2013.01); *G06F 9/5066* (2013.01); *G06F 2209/501* (2013.01); *G06F 2209/503* (2013.01)

(58) Field of Classification Search
USPC .......................................................... 718/104
See application file for complete search history.

(56) References Cited

U.S. PATENT DOCUMENTS

| | | | | |
|---|---|---|---|---|
| 5,408,663 | A * | 4/1995 | Miller | 718/104 |
| 6,098,091 | A * | 8/2000 | Kisor | 709/202 |
| 6,349,406 | B1 * | 2/2002 | Levine et al. | 717/128 |
| 6,363,434 | B1 * | 3/2002 | Eytchison | 719/313 |
| 6,463,457 | B1 * | 10/2002 | Armentrout et al. | 709/201 |
| 7,003,547 | B1 * | 2/2006 | Hubbard | 709/201 |
| 7,395,536 | B2 | 7/2008 | Verbeke et al. | |
| 8,231,471 | B2 * | 7/2012 | Blackburn et al. | 463/42 |
| 2003/0135621 | A1 | 7/2003 | Romagnoli | |
| 2004/0123063 | A1 * | 6/2004 | Dalal et al. | 711/170 |

(Continued)

FOREIGN PATENT DOCUMENTS

| | | |
|---|---|---|
| CN | 1512380 A | 7/2004 |
| CN | 1617126 A | 5/2005 |

(Continued)

OTHER PUBLICATIONS

"International Search Report", Mailed Date: Jul. 30, 2012, Application No. PCT/US2011/065297, Filed Date: Dec. 15, 2011, pp. 13.

(Continued)

*Primary Examiner* — Sisley Kim
(74) *Attorney, Agent, or Firm* — Aneesh Mehta; Kate Drakos; Micky Minhas

(57) ABSTRACT

A personal datacenter system is described herein that provides a framework for leveraging multiple heterogeneous computers in a dynamically changing environment together as an ad-hoc cluster for performing parallel processing of various tasks. A home environment is much more heterogeneous and dynamic than a typical datacenter, and typical datacenter scheduling strategies do not work well for these types of small clusters. Machines in a home are likely to be powered on and off, be removed and taken elsewhere, and be connected by an ad-hoc network topology with a mix of wired and wireless technologies. The personal data center system provides components to overcome these differences. The system identifies a dynamically available set of machines, characterizes their performance, discovers the network topology, and monitors the available communications bandwidth between machines. This information is then used to compute an efficient execution plan for data-parallel and/or High Performance Computing (HPC)-style applications.

20 Claims, 4 Drawing Sheets

(56) References Cited

U.S. PATENT DOCUMENTS

| | | | |
|---|---|---|---|
| 2005/0005271 A1* | 1/2005 | Clymer et al. .................... | 718/1 |
| 2005/0021915 A1 | 1/2005 | Lowe et al. | |
| 2005/0204040 A1 | 9/2005 | Ferri et al. | |
| 2005/0246666 A1* | 11/2005 | Kalinoski et al. ............. | 715/963 |
| 2005/0278453 A1* | 12/2005 | Cherkasova ................. | 709/231 |
| 2006/0190944 A1* | 8/2006 | Moon et al. ................... | 718/104 |
| 2007/0067310 A1 | 3/2007 | Gupta et al. | |
| 2007/0143765 A1 | 6/2007 | Aridor et al. | |
| 2008/0059487 A1 | 3/2008 | Mi et al. | |
| 2009/0210431 A1* | 8/2009 | Marinkovic et al. ............ | 707/10 |
| 2010/0281166 A1* | 11/2010 | Buyya et al. .................. | 709/226 |

FOREIGN PATENT DOCUMENTS

| | | |
|---|---|---|
| CN | 101595444 A | 12/2009 |
| EP | 1239368 A2 | 9/2002 |
| GB | 2416878 A | 2/2006 |

OTHER PUBLICATIONS

"Home based personal data center installation—is it possible???", Retrieved at << http://www.webhostingtalk.com/showthread.php?t=676557 >>, Mar. 6, 2008, pp. 4.

"Inception of the idea for a home data center", Retrieved at << http://blogs.crosscity.com/nagiprojects/HDC/default.aspx >>, May 22, 2010, pp. 4.

Harris, Robin, "Building an energy efficient home computer", Retrieved at << http://www.zdnet.com/blog/storage/building-an-energy-efficient-home-computer/175 >>, Aug. 20, 2007, pp. 9.

"How to make your own home data center options", Retrieved at << http://groups.google.com/group/comp.home.automation/browse_thread/thread/3ad5bbddf8b1ca15 >>, Jan. 7, 2010, pp. 7.

"Home technology emagazine article", Retrieved at << http://www.hometoys.com/ezine/08.08/perumal/virtualization.htm >>, eMagazine Index, vol. 13, No. 4, Aug. 2008, pp. 5.

"Home based personal data center installation", Retrieved at << http://webhosting.bigresource.com/Home-based-personal-data-center-installation-R8kyfeUi.html#17BpzYa >>, Retrieved Date: Oct. 1, 2010, pp. 11.

"First Office Action and Search Report Received for China Patent Application No. 201110428451.1", Mailed Date: Jan. 3, 2014, 15 Pages.

"Search Report Received for European Patent Application No. 11850280.6", Mailed Date: Jul. 2, 2014, 12 Pages.

Marinelli, E. Eugene, "Hyrax: Cloud Computing on Mobile Devices using MapReduce", A Thesis Submitted in Partial Fulfillment of the Requirements for the Degree of Master of Science, Sep. 2009, 124 Pages.

Borthakur, Dhruba, "The Hadoop Distributed File System: Architecture and Design", Published on: Jan. 2007, Available at: http://hadoop.apache.org/docs/r0.18.3/hdfs_design.pdf.

"Second Office Action Issued in Chinese Patent Application No. 201110428451.1", Mailed Date: Oct. 27, 2014, 14 Pages.

"Third Office Action Issued in Chinese Patent Application No. 201110428451.1", Mailed Date: Feb. 17, 2015, 6 Pages.

"Fourth Office Action Issued in Chinese Patent Application No. 201110428451.1", Mailed Date: Aug. 4, 2015, 11 Pages.

* cited by examiner

SCHEDULING AND MANAGEMENT IN A PERSONAL DATACENTER

BACKGROUND

It is increasingly common for households to own more than one computer, and for these machines to be on a home network. Each of these computers has a substantial amount of computing power, memory, and storage capacity. Current popular operating systems allow you to use the resources of the local machine very easily, but it is difficult to make use of the resources of other machines on the network. Hence, when running a compute-intensive application the CPUs of remote machines are typically idle, and their memory is not accessible. Similarly, when running an I/O intensive application the local disk may be 100% utilized, but other storage devices are idle.

Home computational needs are increasing. For example, video editing and transcoding is increasingly common and can take hours to complete. Even with a high-end home computing system, tasks can take a long time to complete. On the other hand, most homes have multiple computers in the form of desktops, laptops, home theater PCs (HTPCs), as well as non-traditional computing devices that contain common computing hardware such as game consoles, mobile phones, and embedded devices (e.g., set top boxes, routers, and other equipment).

In datacenter settings, distributed systems software makes it possible to spread data across multiple storage devices, and to run computations in a parallel fashion across multiple machines. Data centers are often very homogeneous, meaning that each machine has a similar processor, amount of memory, network bandwidth, and other resources. Scheduling algorithms used in datacenters are typically greedy and do not consider machine differences, but rather quantity and availability of machines when scheduling. Various companies provide data-parallel frameworks for spreading job execution to multiple computers in data centers, such as MICROSOFT™ Dryad, Google MapReduce, and Yahoo! Hadoop. Some of these also provide toolsets and programming languages to make parallel computing easier, such as MICROSOFT™ DryadLINQ.

Similar functionality is increasingly useful in a home/personal setting, but much more complex due to issues of heterogeneity, connectivity, power management, and software version/update management. Assumptions that are valid in data centers completely fail in home environments. For example, home computers may come and go as a user takes a laptop or other mobile device into and out of the house. Home computers may use a variety of connection types for networking, such as a Wi-Fi connection when a user is roaming around the house and a wired Ethernet connection when the user docks a laptop. Home computers may also go to sleep or run out of battery power. Finally, home computers include a mish-mash of processors, graphical processing capabilities, memory quantity, disk space, disk speed, and so forth. These differences contribute to distributed computing being virtually non-existent in the home or other small cluster settings.

SUMMARY

A personal datacenter system is described herein that provides a framework for leveraging multiple heterogeneous computers in a dynamically changing environment together as an ad-hoc cluster for performing data-parallel processing of various tasks. In some embodiments, an operating system is modified to provide a distributed file system abstraction, and a service that allows dynamic partitioning and remote execution of data-parallel computations. The operating systems of each system cooperatively measure and analyze the performance of currently available processing, communication, and storage resources and make use of this information to partition computation across machines in the most efficient manner. A home environment is much more heterogeneous and dynamic than a typical datacenter, and typical datacenter scheduling strategies do not work well for these types of small clusters. Machines in a home are likely to be powered on and off, be removed and taken elsewhere, and be connected by an ad-hoc network topology with a mix of wired and wireless technologies. The personal data center system provides components to overcome these differences. The system identifies a dynamically available set of machines, characterizes their performance, discovers the network topology, and monitors the available communications bandwidth between machines. This information is then used to compute an efficient execution plan for data-parallel and/or High Performance Computing (HPC)-style applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
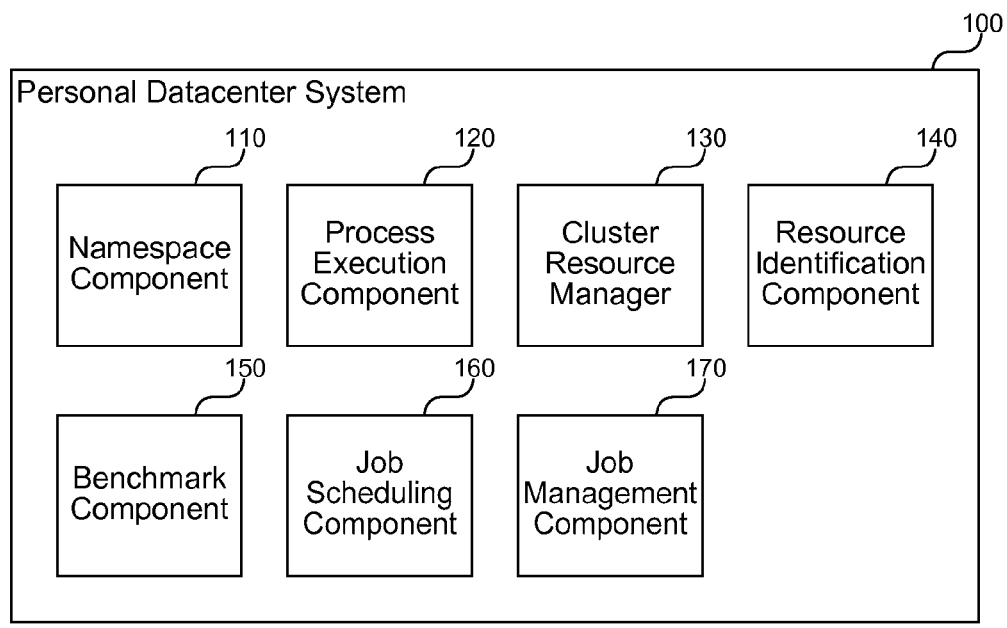
FIG. 1 is a block diagram that illustrates components of the personal datacenter system, in one embodiment.

A personal datacenter system is described herein that provides a framework for leveraging multiple heterogeneous computers in a dynamically changing environment together as an ad-hoc cluster for performing parallel processing of various tasks. In some embodiments, an operating system is modified to provide a distributed file system abstraction, and a service that allows dynamic partitioning and remote execution of data-parallel computations. The operating systems of each system cooperatively measure and analyze the performance of currently available processing, communication, and storage resources and make use of this information to spread computation across machines in the most efficient manner. Distributed file systems and cluster computation services are typically deployed in datacenters with thousands of identical machines, well-managed infrastructure, and ample communications bandwidth. Machines do occasionally fail, but are normally running continuously. Security is not a great concern since all the machines are trusted and owned by the same person.

In contrast, a home environment is much more heterogeneous and dynamic. Machines in a home are likely to be powered on and off, be removed and taken elsewhere, and be connected by an ad-hoc network topology with a mix of wired and wireless technologies. The personal data center system provides components to overcome these differences. The system identifies a dynamically available set of machines (processors, memory, and storage), characterizes their performance (by measurement or by looking up this information in a database), discovers the network topology, and monitors the available communications bandwidth between machines. This information is then used to compute an efficient execution plan for data-parallel and/or High Performance Computing (HPC)-style applications.

Multiple users may own machines, and therefore security is potentially more relevant than in datacenters (where all machines can run with a single level of authority), as is controlled sharing of resources to provide differential Quality of Service (e.g., the user sitting at a machine has priority over users accessing the machine's resources remotely). In some embodiments, the personal datacenter system leverages off-the-shelf software from cluster computation and datacenter settings, such as Dryad, DryadLINQ, and TidyFS. Each machine in the home runs the service processes that provide remote process execution and a shared file system namespace. The data is replicated on multiple machines so that it can be accessed from the closest replica, and so that it is still available if some machine is powered down.

The above software can be extended with security to protect users' data from others, and local resource partitioning and scheduling mechanisms to enforce QoS. Additionally, the OS of each machine runs a service that identifies and benchmarks local resources and registers these with a central database. The operating systems collaboratively discover the relevant network topology and measure the available bandwidth. In some embodiments, the operating systems cooperatively schedule network traffic according to global QoS considerations. A central global job scheduler accepts jobs from any participating machine and identifies an efficient way to partition computations given the current set of available resources, current set of jobs, and their associated QoS parameters.

FIG. 1 is a block diagram that illustrates components of the personal datacenter system, in one embodiment. The system 100 includes a namespace component 110, a process execution component 120, a cluster resource manager 130, a resource identification component 140, a benchmark component 150, a job scheduling component 160, and a job management component 170. Each of these components is described in further detail herein.

The namespace component 110 manages a shared file system namespace between multiple computers. Because data processed by the system 100 may be stored on a variety of computers in the personal data center, the computers use a common namespace to refer to files that can identify any location within the data center. The namespace can be as simple as appending the computer name to the file system namespace of each machine (e.g., \\laptop1\c\file.txt for accessing a file named "file.txt" at the root of a drive labeled "C" on the machine named "laptop1"), or more complex to handle problems such as similar machine names, machine name reuse, non-traditional file systems, and so on. For example, the namespace component 110 may assign a globally unique identifier to each machine and to locations on the machine for storing files and other data.

The process execution component 120 manages execution of processes on each machine that each represent a subdivision of a larger job managed by the system 100. The process execution component 120 may include a service or daemon running on each computer in the personal datacenter that receives instructions from the job scheduling component 160 to execute part of a job on the machine where the service is running. The process execution component 120 invokes a process, monitors the process progress, and gathers execution results at exit of the process. A process can perform a variety of tasks, such as encoding frames of video, searching a disk for files containing particular text, or any other task.

The cluster resource manager 130 stores information describing available computing resources and ongoing distributed jobs that are executing on available computing resources. The cluster resource manager 130 may include one or more files, file systems, databases, storage area networks (SANs), external storage devices, cloud-based storage services, or other facilities for storing data. The system 100 may select a storage location for the cluster resource manager 130 that is likely to remain available even as the datacenter environment changes. For example, the system may store data on a home server or desktop computer that is not configured to sleep. Alternatively or additionally, the system 100 may leverage a remote storage location, such as cloud-based storage, that is accessible with high availability, known server replication protocols, such as Paxos, or techniques like distributed hash tables (DHTs).

The resource identification component 140 identifies computing resources in a personal data center environment that are available for performing distributed, parallel computing tasks. Resources may include one or more devices having any of a central processing unit (CPU), graphics processing unit (GPU), memory, storage space, or other resources that can be leveraged to perform computing tasks or store data used in performing computing tasks. The resource identification component 140 can identify computing resources in a variety of ways. For example, each available computing resource may run a service enrolling the computing resource in the personal data center, so that a central coordination service is proactively informed of the computing resources. Alternatively or additionally, the component 140 may send a querying message, such as a broadcast, inviting available computing resources to respond.

The benchmark component 150 determines one or more capabilities of each identified computing resource. Benchmarking may gather static information and dynamic information from each computing resource. Static information may include information queried from an operating system such as processor speed, number of computing cores, memory size, disk size, network speed, and so forth. Dynamic information may include information such as how busy the computing resource currently is, measured bandwidth between the computing resource and other computing resources, currently available memory, and so on. The benchmark component 150 may run periodically to re-determine available capacity based on changing conditions. The component 150 may also determine a schedule based on historical performance of a computing resource. For example, the component 150 may observe that a desktop system is typically idle during particular hours and typically busy during others. The benchmark component 150 may also determine whether a computing resource is hosting a current interactive user, as the system 100 may prefer to avoid overburdening computers that are actively being used.

The job scheduling component 160 determines a schedule for completing a computing job by analyzing the identified computing resources, the determined capabilities of each computing resource, and one or more demands of the computing job. The demands of the computing job may include information retrieved from metadata or other analysis of the job that identifies the job's likely processing demands, disk usage, memory usage, and so forth. Some parts of a job may be CPU bound while others may be I/O bound or memory bound. Likewise, some computing resources may be well suited to processing intensive tasks, but have little storage space for I/O bound jobs.

The job scheduling component 160 divides the jobs into one or more tasks that can be executed by the available computing resources. The tasks may include independent tasks that can be performed in parallel and completed as well as dependent tasks the output of which act as input to another task. The schedule takes into account the various demands and dependencies to try to find a schedule that will complete the job in a way that satisfies performance criteria. For example, the performance criteria may seek to reduce completion time in some cases, so that the component 160 finds a schedule that makes optimal use of each resource. In other cases, the performance criteria may seek to avoid occupying resources during times of common use, and the component 160 finds a schedule that runs the job during idle hours or on little-used computing resources.

The job management component 170 manages execution of one or more tasks that make up a job on computing resources specified by the determined schedule. For straightforward tasks, managing execution may include gathering input data, executing a process on a computing resource, and gather results. For other more complicated tasks, the component 170 may monitor and report progress, manage gathering of dependent input, and so forth. The job management component 170 may invoke an instance of the process execution component 120 running on each computing resource to run tasks and the namespace component 110 to access input data and gather output data. As tasks complete, the job management component 170 gathers any results and combines them where needed to provide output for the job.

The job management component 170 may also handle sudden unavailability of a selected computing resource. For example, a user may simply leave with a laptop such that connectivity is no longer available or is only available on a much slower network connection. In such cases, the job management component 170 may invoke the job scheduling component 160 to determine a new schedule, fail the task altogether, identify another computing resource to perform the task, or wait for the computing resource to return to complete the task. The remedy selected may depend upon parameters configured by the job author or by users of the computing resources.

The computing device on which the personal datacenter system is implemented may include one or more central processing units, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
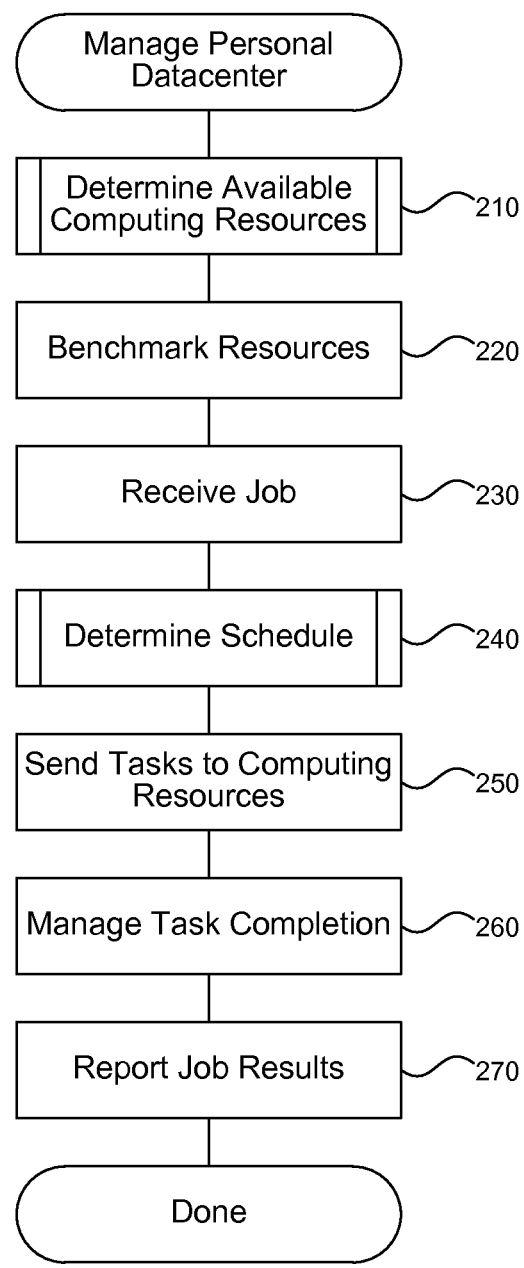
FIG. 2 is a flow diagram that illustrates processing of the personal datacenter system to provide parallel processing in a small, heterogeneous computing environment, in one embodiment.

FIG. 2 is a flow diagram that illustrates processing of the personal datacenter system to provide parallel processing in a small, heterogeneous computing environment, in one embodiment. Beginning in block 210, the system determines available computing resources in the computing environment. The available computing resources may include one or more desktop computers, laptop computers, tablet computers, mobile phones, media computers, home servers, game consoles, or other computing devices in a home or other small network environment. The system can determine available computing resources in a variety of ways, as detailed further with reference to FIG. 3. The system may determine available resources as a function of the resources that exist in the environment as well as the current state of each resource. For example, the system may elect not to use resources that are currently in use by a user or that may soon leave the environment (e.g., a mobile phone) based on historical or other information (e.g., a calendar of the device that indicates that the user plans to be away).

Continuing in block 220, the system runs one or more benchmarks on the determined available computing resources to determine available capabilities that can be used for distributed computing. For example, the system may query an operating system on each computing resource to identify static properties such as CPU speed, installed memory, and disk size, as well as dynamic properties such as percent of CPU available, memory usage, disk usage, and so forth. The system may periodically re-run benchmarks to update a central data store with information about each computing resource that is used for scheduling the resources to perform tasks.

Continuing in block 230, the system receives a job from an originating computing resource for execution on one or more other computing resources. The job may include a job that is too big for the originating computing resource or that will complete faster by utilizing multiple computing resources. The originating computing resource may or may not participate in the execution of the job based on the determined schedule. The job may include metadata or other information that identifies one or more demands or requirements of the job, such as input data involved, logical sub-tasks of the job, resources consumed by parts of the job, and so forth.

Continuing in block 240, the system determines a schedule of one or more tasks for completing the job, wherein the tasks can be distributed to various available computing resources in the computing environment and the determined schedule selects a resource for each task that satisfies one or more performance criteria. The performance criteria may include optimizing the job to complete quickly, keeping computing resources at a certain level of usability, or other goals. The system schedules tasks in a way that pairs a task's demands with the computational capabilities of a computing resource. For example, the system will attempt to schedule processor intensive tasks to computing resources with fast processors.

Continuing in block 250, the system sends information describing each task to an available computing resource to perform the task. The system may provide a process for each computing resource to execute or instructions for a process already available on the computing resource to execute (e.g., in the case of a virtual machine or scriptable execution engine). The system may also provide information identifying where in the namespace to find input data and/or to place output data.

Continuing in block 260, the system manages each task to completion and gathers the individual task results for the job. Managing each task may include handling failed tasks. Tasks may fail for a variety of reasons, such as a computing resource suddenly becoming unavailable (e.g., due to a user logging on or taking the resource out of the environment). The system may attempt to complete the job after a task failure by assigning failed tasks to another computing resource. As each task completes, the system gathers the results and combines the results as dictated by the job. For example, if the job is one that can be divided so that each task performs a small amount of work towards an aggregate result (e.g., encoding a large video), then the system may receive each task's individual result and combine them to form the aggregate result.

Continuing in block 270, the system reports the job results to the originating computing resource. The results may include one or more result codes, output files stored in the namespace, email messages, and so on. After block 270, these steps conclude.

Figure 3:
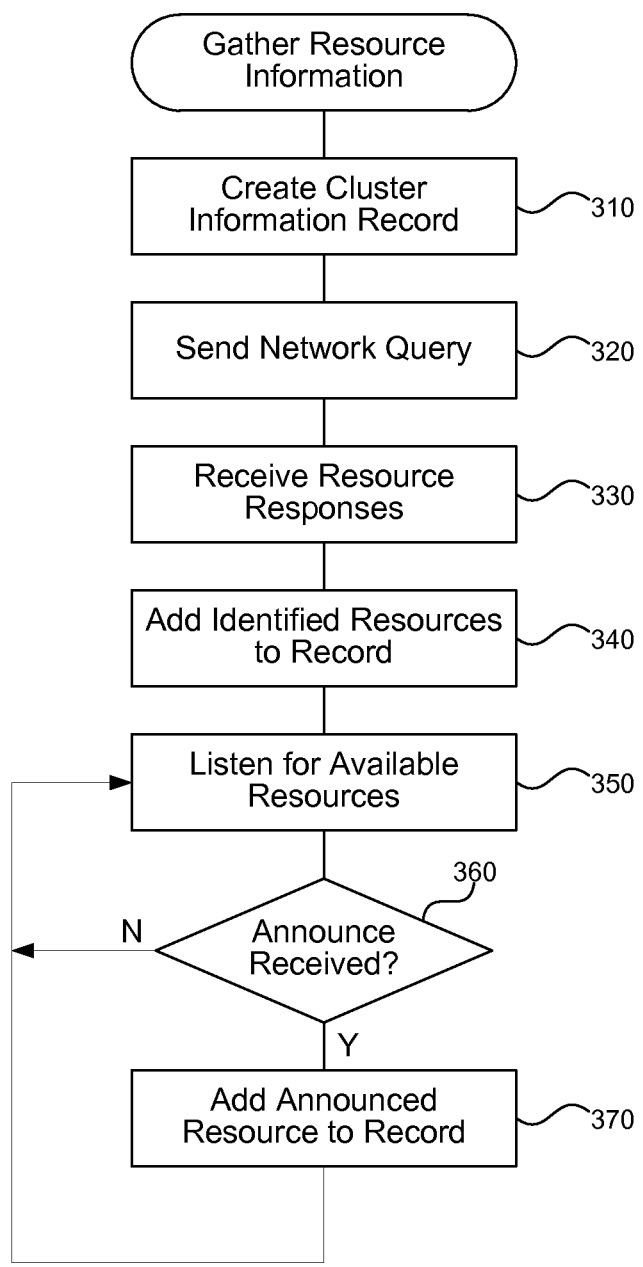
FIG. 3 is a flow diagram that illustrates processing of the personal datacenter system to gather information about available computing resources, in one embodiment.

FIG. 3 is a flow diagram that illustrates processing of the personal datacenter system to gather information about available computing resources, in one embodiment. The system may perform these steps during an initial setup process as well as listening for new computing resources on an ongoing basis. In some embodiments, the system interacts with external components, such as a router or other device that provides a domain name system (DNS) server, to discover new computing resources. Many home environments include a Wi-Fi and/or Ethernet router to which each computing resource connects. MICROSOFT™ has a protocol called BAND that is used for scalable node discovery on networks, and there is also the Link Layer Topology Discovery protocol for determining the configuration of network switches and hubs, as well as measuring bandwidth.

Beginning in block 310, the system creates a cluster information record in a cluster resource manager. The record may include a file stored on one of the computing resources in the datacenter environment, a remotely stored record in a commercial datacenter, or some other storage facility for persistently tracking the computing resources available in the environment.

Continuing in block 320, the system sends a network query to identify computing resources in the personal datacenter. For example, the network query may include a broadcast message sent via each connection transport discovered in the personal datacenter. A typical home may include a Wi-Fi network and a wired Ethernet network. The system can send a broadcast message on each network or may direct a well-known message to a known port for each computer identified in the personal datacenter through an external source of information. Some operating systems, such as MICROSOFT™ WINDOWS™ maintain a cache of discovered computer systems, such as those identified via the Server Message Block (SMB) protocol or Network File System (NFS) protocol. The system can also use the BAND or other protocols described herein to capture this information. Routers may include a table of DNS leases that identifies each computing resource that has connected to the router. These and other sources can help the system identify computing resources.

Continuing in block 330, the system receives one or more responses from available computing resources. The response to the network query indicates that the computing resource is available for distributed computing and may include metadata that specifies restrictions, capabilities, or other useful information about the computing resource. The restrictions may include information about tasks scheduled on the computing resource that cannot be interrupted (e.g., recording television on a media computer), and the like. The capabilities may include benchmarking information, available network connection types, and so forth. The response may also indicate times when the computing resource is typically outside of the personal datacenter, such as a laptop indicating when the user is normally at work.

Continuing in block 340, the system adds the available computing resources to the cluster information record. The system may store any received metadata as well as information for reaching the computing resource, such as a network transport and address associated with the computing resource. In some embodiments, the system continues listening for additional computing resources to announce their presence as they become available, as described further in the following steps.

Continuing in block 350, the system listens for additional computing resources to announce their availability in the personal datacenter. This may include resources that were disconnected during the earlier query or resources that were unavailable for distributed computing. The system may define a protocol, such as when incorporated into an operating system, for announcing the availability of a computing resource, and resources may announce themselves upon connecting to new networks or under other conditions. In some embodiments, previously identified resources may continue to announce their availability to the server in a kind of heartbeat that informs the server that the resource has not been disconnected.

Continuing in decision block 360, if the system receives an announce message, then the system continues at block 370, else the system loops to block 350 to continue listening for available computing resources. The system may listen for as long as any computing resource is connected to the datacenter or may exit this process after a defined setup phase is complete.

Continuing in block 370, the system adds the announced resource to the cluster information record. The system stores information about the resource useful for scheduling tasks to execute on the resource. In addition, for any identified computing resource the system may direct the resource to install one or more processes or services for participating in the personal datacenter, such as a process execution component and a benchmarking component. The installed processes gather information and handle tasks that are difficult to perform remotely. After block 370, these steps conclude.

Figure 4:
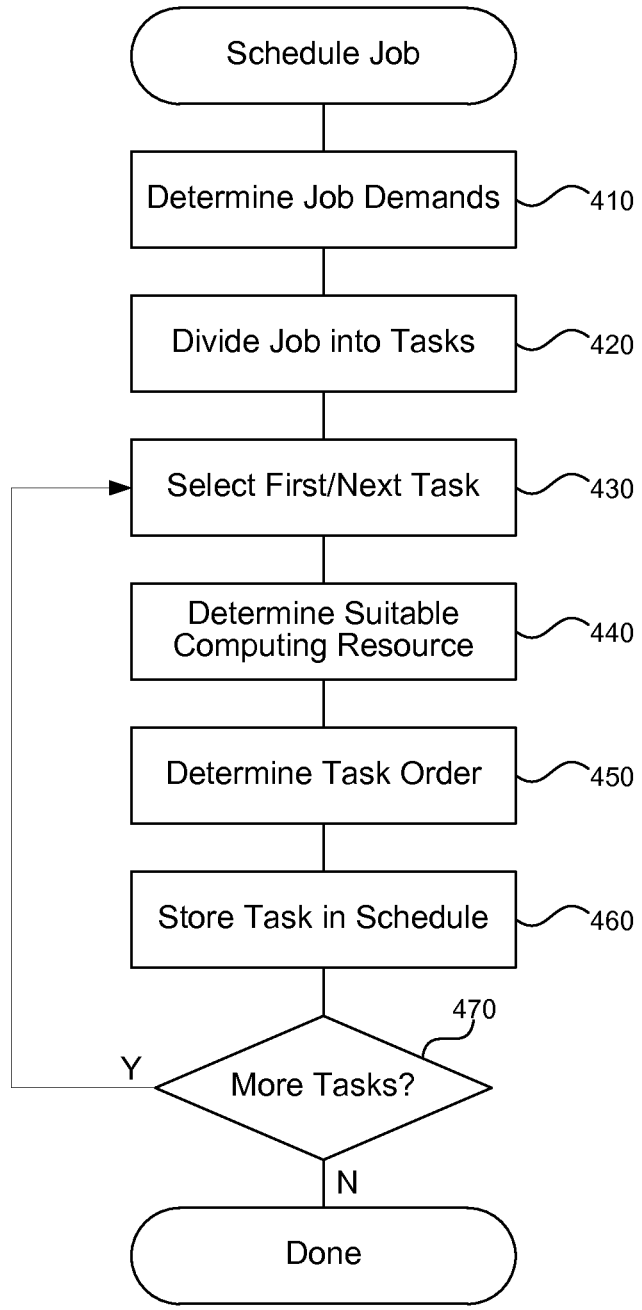
FIG. 4 is a flow diagram that illustrates processing of the personal datacenter system to schedule a job on available computing resources, in one embodiment.

FIG. 4 is a flow diagram that illustrates processing of the personal datacenter system to schedule a job on available computing resources, in one embodiment. Beginning in block 410, the system determines one or more demands of a job submitted for processing by one or more available computing resources in a personal datacenter. The job demands may include CPU, memory, disk, or other requirements that affect the execution of the job. The job may include metadata that describes the demands of the job or the system may automatically determine the job's demands by inspecting the job (e.g., based on information provided by the programming language, static analysis of executable code, or other methods).

Continuing in block 420, the system divides the job into one or more tasks wherein each task is suitable for performing on one of the available computing resources. The tasks may be identified by the job itself or the system may automatically identify and create the tasks to accomplish the job. Many types of computing problems can be divided into independent tasks that can be performed and then combined to produce a result. The system may divide the job based on a quantity of available computing resources, based on demands associated with each task, or other criteria that relate to how efficiently each task will execute on the available computing resources. There are many ways to subdivide a program into tasks— these may result in different ordering constraints between tasks, and different amounts of data communicated between subtasks. The system can extract this information from the program and store the information in the form of a task dependency graph whose nodes record properties of the task computation demands and whose edges record the data/communication demands. Additionally, the system may include a component that can predict the runtime of a task (vertex) on any given node in the system, given the location of its input and output data.

Continuing in block 430, the system selects a first task of the job. The system may sort the tasks to process them in a particular order (e.g., by processing demands) or may select the first task specified in the job. On subsequent iterations, the system selects the next task.

Continuing in block 440, the system determines a suitable computing resource for performing the selected task. The system matches the demands of the task with capabilities identified for each computing resource. The system uses benchmarking described herein to maintain an up to date view of the capabilities of each computing resource, and then matches the benchmarking results to appropriate tasks. For example, a compute heavy task is likely suited to a computer with a fast processor while an output heavy task may be suited to a computer with a lot of disk space to store results. The system pairs each task with an appropriate computing resource. In some cases, the scheduling of the system may not pair a particular task with the fastest resource in order to increase the overall speed of completion of the job.

Those of ordinary skill in the art that determining a resource for a particular task can be performed by a range of simple to complex algorithms. For example, there may be two tasks whose input data is ready (i.e., all dependencies are satisfied). The system may decide to run them on different nodes, but their input data might currently reside on the same disk. If both tasks access the same disk simultaneously, then they will see degraded performance. A more sophisticated scheduler might pay attention to such effects and arrange for the input data of the two tasks to be stored in different locations, or deliberately choose not to run the two 'runnable' tasks simultaneously. As another example, the system may prefer to compute a schedule statically, but due to data dependence of computation times, and due to variable load on system resources this may be impractical, such that scheduling includes a runtime component that makes such decisions dynamically.

Continuing in block 450, the system determines an order in which to complete the task. Each task may have dependencies on other tasks and there may be more tasks than computing resources such that the system schedules each task to execute in a particular order. The system determines an order that will allow each task's output to be available to tasks that consume the output and that will produce a schedule that satisfies one or more performance criteria for the system.

Continuing in block 460, the system stores the task information in a schedule that can be executed by the available computing resources. The system may store the schedule to disk or in-memory and invoke other components of the system to carry out the schedule and handle processing of results.

Continuing in decision block 470, if there are more tasks to schedule, then the system loops to block 430 to select the next task, else the system completes. After each task has been scheduled, the schedule is complete and the system may begin sending out and executing the tasks according to the determined schedule. After block 470, these steps conclude.

In some embodiments, the personal datacenter system interfaces with a commercial datacenter outside of the personal datacenter to carry out some tasks. For example, a commercial datacenter (e.g., MICROSOFT™ WINDOWS™ AZURE™) may offer home users a subscription or per-use plan that allows a home user to pay to have certain compute intensive tasks performed remotely on hardware with faster specifications than that available within the personal datacenter. A user may choose to pay to have a job completed faster and thus may select a commercial datacenter as an optional computing resource for completing some tasks. The system can incorporate this information during scheduling to increase speed (e.g., by using the commercial datacenter), to reduce cost (e.g., by avoiding the commercial datacenter when personal datacenter resources are sufficient), and so forth. Performance prediction helps the user to assess the cost/benefit of paying for additional resources.

In some embodiments, the personal datacenter system stores historical schedule information about each computing resource and gathers other scheduling hints. For example, the system may access a calendar of appointments associated with a particular computing device or user that indicates when mobile computing resources may be unavailable or connected through a slower network connection (e.g., 3G versus Wi-Fi). The system may also store information about each program/job that has run before. The system retains statistics to improve future performance productions. Based on the history, the system may determine that a computing resource is likely to be away during a scheduled job and avoid scheduling tasks to that resource. On the other hand, for jobs that are due after the device will return, the system may be able to leverage the device in the schedule even while the device moves into and out of accessibility to the personal data center. Other concerns, such as battery life, may also inform the system's scheduling choices.

In some embodiments, the personal datacenter system uses geo-location information to identify a location of a computing resource and schedule the resource based on information inferred from the location. For example, based on global positioning system (GPS) information the system may determine that a user is returning home with a mobile computing device and will soon be within range of a fast (e.g., Wi-Fi) network connection. Thus, the system may schedule one or more tasks to execute on the mobile device, even though the device may currently have a slower connection.

From the foregoing, it will be appreciated that specific embodiments of the personal datacenter system have been described herein for purposes of illustration, but that various modifications may be made without deviating from the spirit and scope of the invention. For example, although using the system in a home setting has been described, the system can also be applied to other small, heterogeneous groupings of computing resources, such as small offices, coffee shops, classrooms, and so forth. Accordingly, the invention is not limited except as by the appended claims.

We claim:

1. A computer-implemented method for providing parallel processing in a heterogeneous personal computing environment, the method comprising:

determining one or more available computing resources in the computing environment by gathering information related to one or more computing resources actively connected to a personal network wherein determining further comprises determining if a device is a candidate to leave the computing environment based upon a current time and a historical entry and exit of the device to the personal network and categorizing that device as an unavailable computing resource when it is determined the device is the candidate to leave the computing environment;

running one or more benchmarks on the determined available computing resources to determine available capabilities that can be used for distributed computing;

receiving a job from an originating computing resource for execution on one or more other computing resources;

determining a schedule of one or more tasks for completing the job, wherein the tasks can be distributed to various available computing resources in the computing environment and the determined schedule selects a resource for each task that satisfies one or more performance criteria;

sending information describing each task to an available computing resource to perform the task;

managing each task to completion and gathering individual task results for the job; and reporting the job results to the originating computing resource, wherein the preceding steps are performed by at least one processor.

2. The method of claim 1 wherein determining one or more available computing resources comprises identifying one or more desktop computers, laptop computers, tablet computers, mobile phones, media computers, home servers, and game consoles connected via one or more networks in a home.

3. The method of claim 1 wherein determining one or more available computing resources comprises electing not to use resources that are currently in use by a user.

4. The method of claim 1 wherein running one or more benchmarks comprises querying an operating system on each computing resource to identify static and dynamic properties of the resource.

5. The method of claim 1 wherein running one or more benchmarks comprises periodically re-running benchmarks to update a central data store with information about each computing resource's availability for scheduling the resource to perform tasks.

6. The method of claim 1 wherein receiving the job comprises receiving a job that will complete faster by utilizing multiple computing resources rather than the originating computing resource alone.

7. The method of claim 1 wherein receiving the job comprises receiving metadata that identifies one or more demands of the job that affects how the job is scheduled to available computing resources.

8. The method of claim 1 wherein determining the schedule comprises optimizing the job to complete quickly by matching demands of tasks of the job to capabilities of available computing resources.

9. The method of claim 1 wherein the performance criteria include avoiding over utilizing computing resources with a current interactive user.

10. The method of claim 1 wherein the performance criteria include identifying a schedule likely to complete in a fastest possible time.

11. The method of claim 1 wherein said sending information describing each task comprises providing a process for each computing resource to execute or instructions for a process already available on the computing resource to execute to perform the task.

12. A computer system for managing a heterogeneous personal datacenter, the system comprising:
a processor and memory configured to execute software instructions embodied within the following components;
a namespace component that manages a shared file system namespace between multiple computers in the personal datacenter;
a process execution component that manages execution of processes on each computing resource, wherein each process represents a subdivision of a larger job managed by the system;
a cluster resource manager that stores information describing available computing resources and ongoing distributed jobs that are executing on available computing resources in the personal datacenter;
a resource identification component that identifies computing resources in a personal data center environment that are available for performing distributed, parallel computing tasks, wherein an available computing resource is considered to be unavailable based upon a current time and a historical entry and exit of the device to the personal network and categorizing that device as an unavailable computing resource when it is determined that the available computing resources may soon leave the personal datacenter;
a benchmark component that determines one or more capabilities of each identified computing resource;
a job scheduling component configured to determine a schedule for completing a computing job by analyzing the identified computing resources, the determined capabilities of each computing resource, and one or more demands of the computing job; and
a job management component that manages execution of one or more tasks that make up a job on computing resources specified by the determined schedule.

13. The system of claim 12 wherein the process execution component includes a service or daemon running on each available computing resource in the personal datacenter that receives instructions from the job scheduling component to execute part of a job on the computing resource where the service is running.

14. The system of claim 12 wherein the cluster resource manager location is selected that is likely to remain available even as the datacenter environment changes.

15. The system of claim 12 wherein the resource identification component identifies one or more resources that include any of a central processing unit (CPU), graphics processing unit (GPU), memory, storage space, or other resources that can be leveraged to perform computing tasks or store data used in performing computing tasks.

16. The system of claim 12 wherein the benchmark component determines an availability schedule based on historical entry and exit of a computing resource into and out of the personal datacenter.

17. The system of claim 12 wherein the job scheduling component performs analysis of the job to identify at least one of the job's likely processing demands, disk usage, memory usage, and communication.

18. The system of claim 12 wherein the job scheduling component divides a job into one or more tasks that can be executed by the available computing resources, wherein each task is an independent task that can be performed in parallel and completed on a single computing resource.

19. The system of claim 12 wherein the job scheduling component divides a job into one or more tasks and identifies one or more dependencies between tasks.

20. A computer-readable storage medium comprising instructions for controlling a computer system to schedule a job on one or more available computing resources in a personal datacenter, wherein the instructions, upon execution, cause a processor to perform actions comprising:
  determining one or more demands of a job submitted for processing by one or more available computing resources in the personal datacenter;
  dividing the job into one or more tasks wherein each task is suitable for performing on one of the available computing resources;
  selecting a task of the job for scheduling;
  determining a suitable computing resource for performing the selected task by matching the determined demands of the task with capabilities identified for the determined computing resource, wherein determining a suitable device removes from consideration one or more of the available computing resources based upon an anticipated availability of the one or more available computing resources based upon a current time and a historical entry and exit of the device to the personal network and categorizing that device as an unavailable computing resource;
  determining an order in which to complete the task; and
  storing the determined resource and order as task information in a schedule that can be executed by the available computing resources.

* * * * *